July 15, 1952 L. B. FORMAN 2,603,037
TRANSMISSION CONTROL APPARATUS
Filed Jan. 21, 1949 3 Sheets-Sheet 1

INVENTOR.
Louis B Forman.
BY
Harness and Harris
ATTORNEYS.

July 15, 1952 L. B. FORMAN 2,603,037
TRANSMISSION CONTROL APPARATUS
Filed Jan. 21, 1949 3 Sheets-Sheet 2
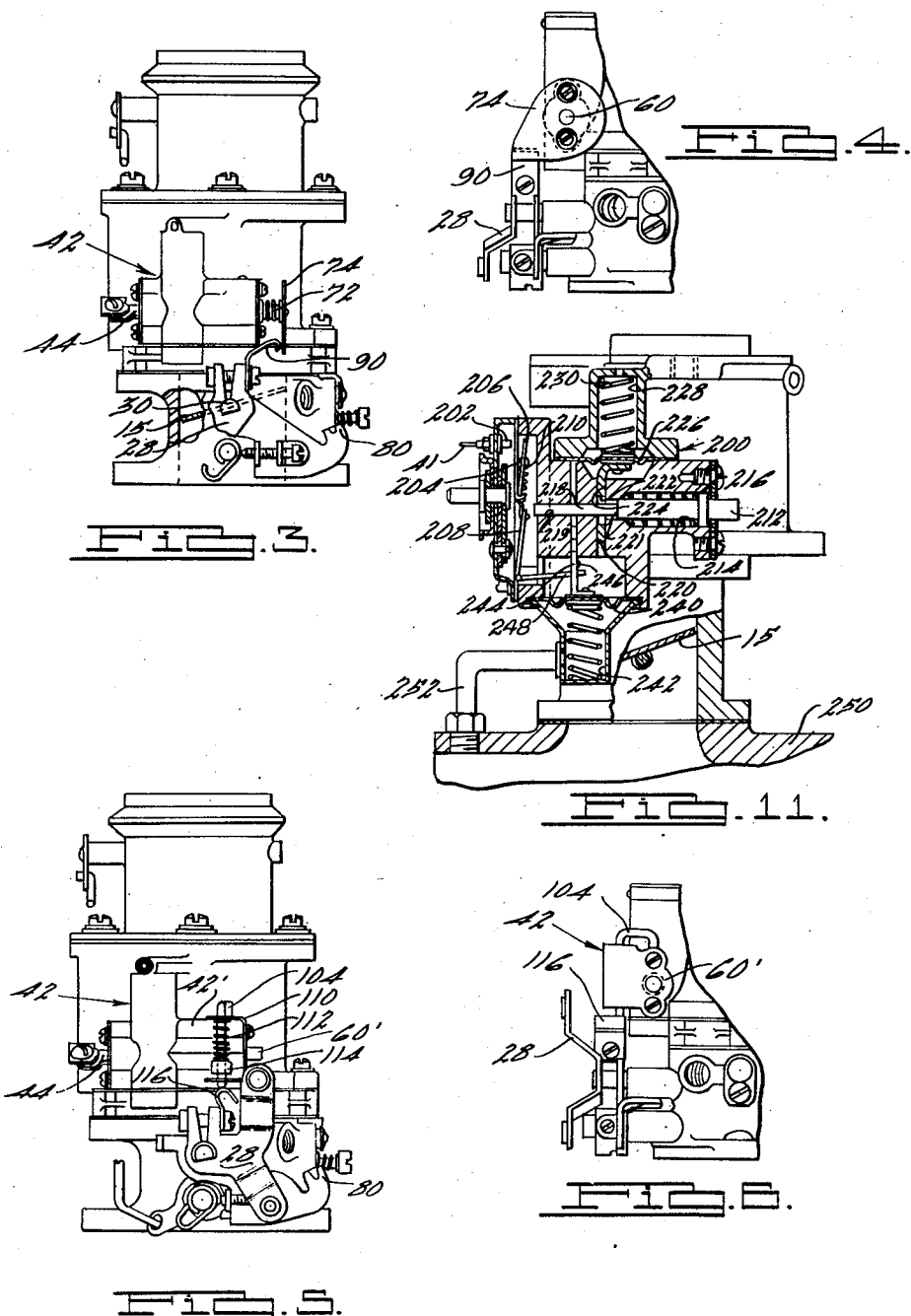
INVENTOR.
Louis B. Forman.
BY
Harness and Harris
ATTORNEYS.

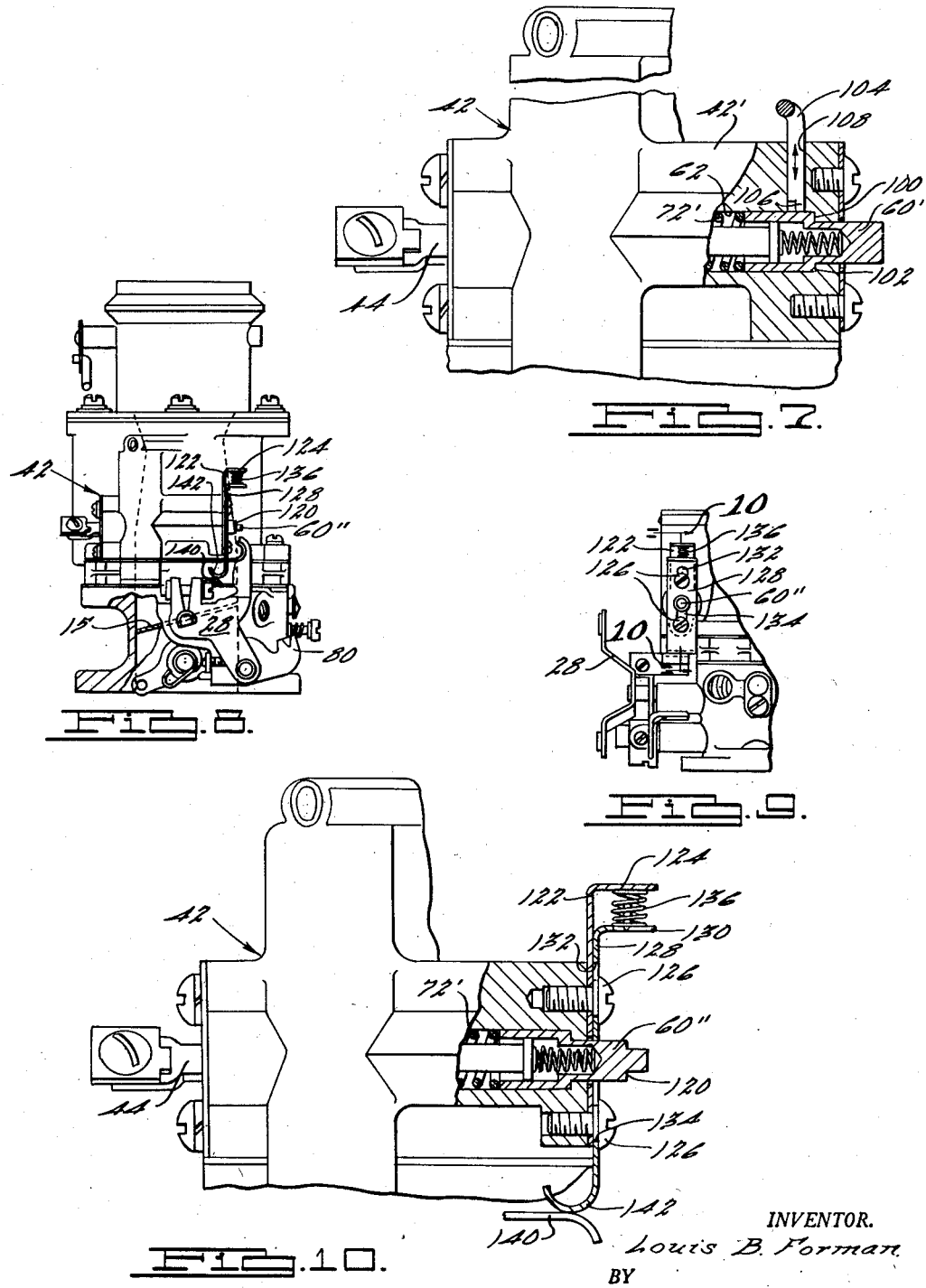

Patented July 15, 1952

2,603,037

UNITED STATES PATENT OFFICE 2,603,037

TRANSMISSION CONTROL APPARATUS

Louis B. Forman, Detroit, Mich., assignor to Chrysler Corporation, Highland Park, Mich., a corporation of Delaware Application January 21, 1949, Serial No. 71,933

4 Claims. (Cl. 47—472)

This invention relates to a transmission control mechanism for an automotive vehicle and more particularly to means to control the initiation of a change in transmission speed ratio drive.

Reference will be made herein to a relatively fast speed drive which is usually the cruising drive for a vehicle. This may, for example, be a one to one driving speed ratio known as a direct drive or an overdrive. Reference will also be made to a relatively slow speed drive which is a vehicle accelerating speed ratio drive and may be a torque multiplying drive, or where an overdrive is provided for the relatively fast speed drive the relatively slow speed drive may be a direct drive. The term kickdown, as used herein, refers to a downshift or step-down in the transmission as, for example, a downshift from the relatively fast speed drive to the relatively slow speed drive.

In automotive vehicles having automatic controls associated with variable speed ratio transmissions it has been found desirable to provide means responsive to control by the operator for reverting to a relatively slow speed drive when the operator is confronted with an emergency demanding fast acceleration. Such means have usually included a solenoid actuator and controls therefore including a switch which is arranged to cooperate with the engine carburetor throttle control mechanism so as to cause a change in speed ratio drive of the vehicle when the usual accelerator pedal is depressed to a predetermined position. It has also been found with such arrangements that under certain conditions as where the vehicle is traveling at a comparatively high rate of speed the transmission cannot be safely operated in a relatively slow speed drive as above described due to the excessive engine speed which would be required. Means have heretofore been provided for limiting the operation of such controls to those engine and vehicle speeds in which a relatively slow speed drive may be safely accommodated.

It is an object of this invention to provide a control for a variable speed ratio transmission by means of which a solenoid actuator associated with the transmission may be actuated to effect a change in transmission speed ratio drive by positioning the throttle control linkage in a predetermined position and to associate with this control a means to maintain the condition of the control so established after the throttle control linkage has retracted from the above predetermined position. The speed ratio drive effected by the solenoid is thus maintained after the throttle control linkage has been moved from the above predetermined position.

It is an additional object of this invention to associate the above control with a second control adapted to render the first control inoperative above a predetermined vehicle speed.

The transmissions illustrated and described in Patent No. 2,348,763 issued on May 16, 1944, to A. J. Syrovy et al. and the copending application, Serial No. 374,674, of Neracher et al., are examples of transmissions to which the controls to be described herein may be applied.

In the drawings:

Fig. 3 is a side elevation of the carburetor and control of Fig. 1;

Fig. 4 is a partial elevation of the device illustrated in Fig. 3;

Fig. 5 is a side elevation of a carburetor embodying a modified form of the invention;

Fig. 6 is a partial elevation of the device illustrated in Fig. 5;

Fig. 7 is an enlarged view, partly in section, of a portion of the control mechanism of Fig. 5;

Fig. 8 is a side elevation of a carburetor embodying another form of the invention;

Fig. 9 is a partial elevation of the device illustrated in Fig. 8;

Fig. 10 is an enlarged view, partly in section, of a portion of the control mechanism of Fig. 5; and Fig. 11 is a view, partly in section, of a modified form of a switch control mechanism.

Figure 1:
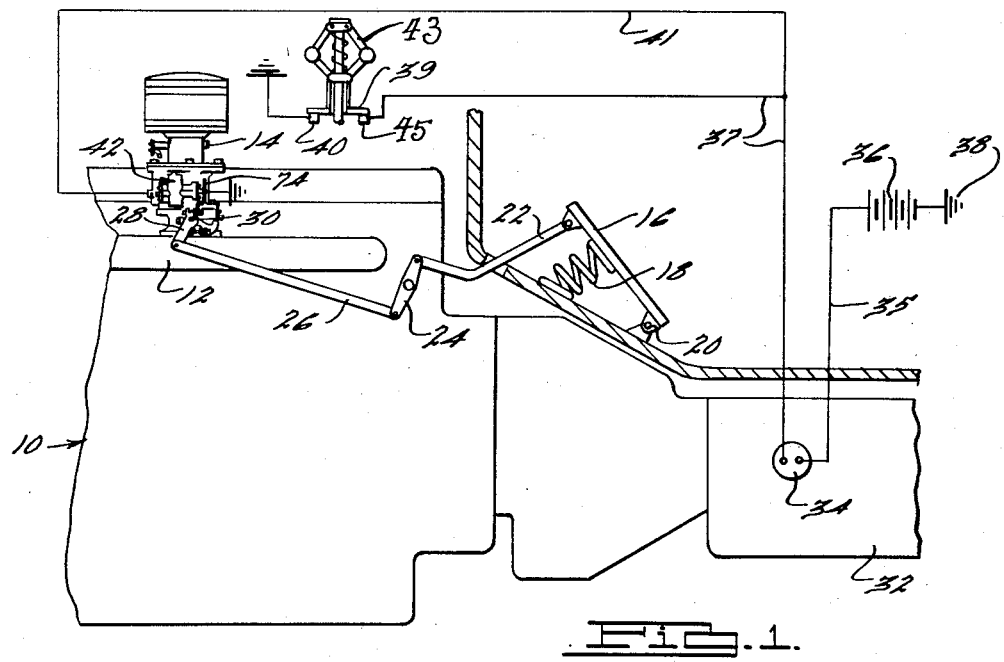
Fig. 1 is a diagrammatic view showing a portion of an automotive engine including a carburetor and a power transmission with the present invention applied thereto.

Certain abbreviated terminology will be adopted herein to facilitate the description of the invention. The means associated with the throttle control linkage and which is adapted to cause a relatively slow speed drive to be effected will be hereinafter referred to as a kickdown control. The means which limits the operation of the kickdown control to certain engine and vehicle speeds will be referred to as an upper limit control.

It is apparent that the control desired herein should be associated with some manipulation of the throttle linkage which will signal the operator's desire for an upshift and yet permit some latitude of vehicle operation with respect to engine speed during the relatively slow speed drive. The control, therefore, should be designed to initiate an upshift as the throttle is brought towards a throttle closing position beyond the lower limit of throttle opening that would normally be desired in the operation of the vehicle in its relatively slow speed drive.

The numeral 10 generally indicates an internal combustion engine having an intake manifold 12 on which is mounted a carburetor 14. The carburetor is provided with a conventional throttle valve 15 (Fig. 3) which is adapted to be manipulated by movement of an accelerator pedal 16. The pedal 16 is yieldably urged to its throttle closing position by a spring 18. Pedal 16 which is pivotally mounted at 20 has linkage operatively connected thereto for remote control of the throttle and this linkage is indicated by the numerals 22, 24, 26, 28 and shaft 30.

A variable speed ratio transmission has been generally indicated by the numeral 32 and is positioned rearwardly of the engine 10 and adapted to transmit drive from the engine 10 to a propeller shaft (not shown). U. S. Patent No. 2,348,763 and copending application, Serial No. 374,674, illustrate transmissions which could be controlled by the apparatus to be described herein. A solenoid actuator 34 illustrated as mounted on the side of the transmission 32 may be associated with the transmission control apparatus so that energization of the solenoid actuator 34 will effect a kickdown or downshift of the transmission to a relatively slow speed drive. Deenergization of the solenoid actuator 34 may be utilized to effect an upshift of the transmission to a relatively fast speed drive.

In Fig. 1 a typical circuit with which my invention may be associated for the control of the energization of solenoid actuator 34 has been illustrated as including a vehicle storage battery 36 which is grounded at 38. The circuit from the battery includes a conductor 35 connecting the battery to the solenoid actuator 34, a conductor 37 connecting solenoid actuator 34 to a grounded vehicle speed responsive governor 43 having terminals 40 and 45 and switch means 39 to electrically connect these terminals when the vehicle speed is less than a predetermined value. The circuit also includes a grounded kickdown control switch 42 incorporating my invention and connected by a conductor 41 to the conductor 37 so that the governor switch 39 and kickdown switch 42 are in parallel. The switches 39 and 42 are each operable when closed to ground the circuit. The governor 43 may be of any suitable design which is operatively connected to a driven portion of the transmission.

Operation of the kickdown control to be discussed herein is limited to those occasions on which the predetermined vehicle speed controlling the governor 43 has been exceeded so that the terminals 40 and 45 are not electrically connected. A kickdown control is not necessary below this predetermined speed as the governor switch 39 provides an energization of solenoid actuator 34 and a relatively slow speed drive.

Figure 2:
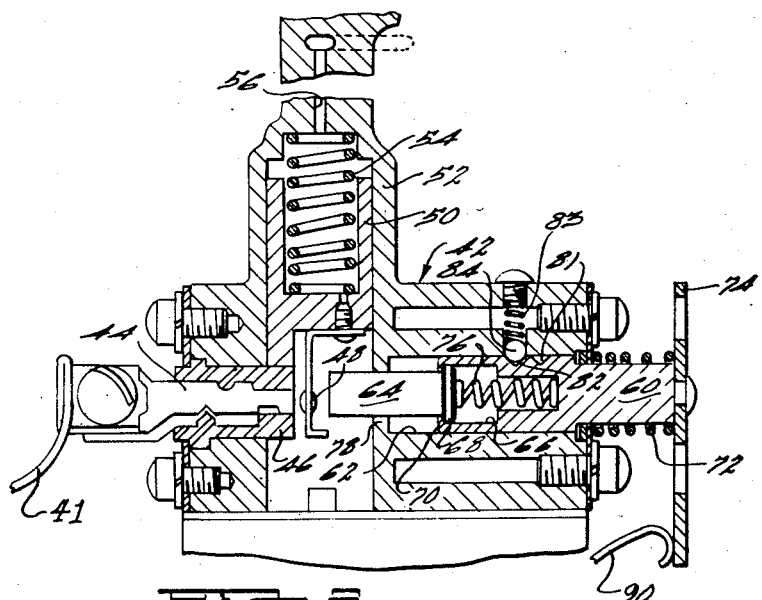
Fig. 2 is an enlarged sectional view illustrating the control mechanism applied to the carburetor shown in Fig. 1, a portion of the carburetor being broken away.

The kickdown control switch 42 is illustrated in detail in Figure 2. An electrical conductor 41, previously referred to, is connected with a first conductor terminal 44 which is electrically insulated at 46 from the supporting carburetor parts. A movable contacting conductor 48 of silver or other suitable material is connected to and extends downwardly from a piston 50. The conductor 48 is free from engagement with the first terminal 44 prior to operation of the kickdown control mechanism as hereinafter described. Conductor 48 is sufficiently resilient so that it can be flexed into contact with the terminal 44 and will assume its Figure 2 position again when the parts are in position as shown.

The piston 50 which is the movable portion of the upper limit control previously referred to is free to slide in a cylinder 52 and is urged downwardly therein by a spring 54 until the piston engages the insulation 46. The upper end of the piston is open to receive the spring 54 and the interior of cylinder 30 is connected by a passage 56 to the engine intake conduit at the atmospheric side of the throttle valve 15 so that the piston 50 is always subjected to the vacuum existing on the atmospheric side of the throttle valve. It is preferable if the passage 56 is connected to the throat of the conventional carburetor venturi (not shown).

The spring 54 yieldably urges the piston 50 downwardly to the position illustrated in Figure 2 to position the contact 48 in line with the fixed terminal 44 for engagement therewith under the influence of the control mechanism unless the vacuum in the intake and passage 56 is sufficient to withdraw piston 50 and contact 48 upwardly out of alignment with the terminal 44.

Means are provided herein which are responsive to operation of the throttle control mechanism during a portion of its throttle opening movement and preferably during that portion thereof when the accelerator pedal 16 is brought to its fully depressed position corresponding to approximately full open position of the throttle valve 15, or an overtravel of the pedal beyond the full open throttle valve position, to ground the conductor 44 through contact 48. A plunger-like member 60 is slidably mounted in a cylinder 62 formed in the housing of switch 42. A second plunger-like member 64 is slidably received in a bore 66 provided in member 60. The members 60 and 64 are retained against relative separation in an axial direction by an enlarged portion 68 of the member 64 cooperating with an inwardly directed flange 70 carried by the member 60. The members 60 and 64 are yieldably urged to their Figure 2 position by a relatively heavy spring 72 which reacts against a plate 74 carried by plunger 60, and the housing of switch 42. A spring 76 interposed directly between the members 60 and 64 urges the enlarged portion of the member 64 to the left as viewed in Figure 2 against the flange 70 of the member 60 and the members 60 and 64 as thus assembled cooperate to serve as a switch operating plunger device. The lever 28 which forms a part of the linkage connecting the accelerator pedal with the throttle valve, and which was previously referred to, is illustrated in Figure 3 as provided with an extension 80 adapted to contact the exterior end of member 60 or its associated plate 74 when the pedal is depressed so that the throttle valve 15 is in substantially wide open throttle position. If desired, the contact of extension 80 with plate 74 may be adjusted to occur in response to an overtravel of the pedal 16 beyond full open throttle position. In either event the extension 80 applies an axial force tending to move the member 60 to the left in Fig. 2 in response to contact of these parts. This movement occurs against the opposition of spring 72 and the plunger-like member 64 is yieldably forced to the left in Fig. 2 by spring 76 until it flexes the contact terminal 48 into contact with the terminal 44. The conductor 41 is thus grounded through 44, 48, 64 and the parts within the bore 62 which are in electrical connection with the carburetor casing.

When, however, the vacuum on the atmospheric side of the throttle valve is sufficient to draw the piston 50 upwardly against the force of the spring 54 and thereby dispose the contact 48 out of alignment with the terminal 44 depression of the accelerator pedal 16, as aforesaid, will not result in formation of the grounded electric circuit for the parts are so arranged that the plunger-like member 64 does not have sufficient stroke under such circumstances to engage the terminal 44. A suitable stop 78 in the form of a shoulder on the switch housing is provided to limit the movement of the members 60 and 64.

Kickdown switches and upper limit control switches generally are recognized as devices heretofore employed in the art. However, in certain transmissions it is desirable to provide latching means for retaining the member 64, contact 48 and terminal 44 in electrical contact after the accelerator pedal 16 has initiated a kickdown and subsequently been retracted to a more modified throttle opening position. Therefore, I have found it desirable to provide a pair of spaced recesses 81 and 82 on the periphery of member 60, a ball detent 84 and spring 83 adapted to extend the detent for engagement selectively with the recesses 81 and 82. The cooperation of the ball detent with the recesses assures that the member 60 will be retained in either of two positions, in spite of the effect of spring 72, until an additional force is applied to the member 60. Force is applied in one direction by contact of extension 80 of lever 28 with plate 74 or member 60. However, when the kickdown has been effected and the member 60 is so positioned that the ball detent 84 is in engagement with the recess 81 then it becomes necessary to provide a supplemental means for applying a force to move the member 60 to the right in Fig. 2 to disconnect the member 64 from contact 48 to return the vehicle to a higher speed ratio drive. For this purpose an extension 90 has been provided on the lever 28. The extension 90 is so positioned with respect to the lever 28 and the plate 74 that a return of the pedal 16 and the associated throttle control linkage toward a closed throttle position will at a desired predetermined position effect an engagement of the extension 90 with the plate 74 so that continued movement of the linkage toward a throttle closing position under the influence of spring 18 will force the plate 74 and member 60 to the right in Fig. 2 into the position illustrated in Fig. 2 to effect a separation of member 64 from contact 48 and a deenergization of solenoid actuator 34 with a consequent upshift in transmission speed ratio drive. It is assumed, of course, that the governor switch is open at this time because the vehicle speed exceeds the predetermined vehicle speed controlling the closing of the governor switch. It is only under these conditions that an operator would require the switch 42 to induce an upshift.

Figs. 5, 6 and 7 illustrate a modified form of latching means for the member 60. The spring pressed ball detent 84 and recesses 81 and 82 are omitted in this form of the invention and the spring 72 described in Fig. 2 is positioned within the circular bore 62. This spring is labelled 72' in Fig. 7. The member 60 is designated by the numeral 60' in Fig. 7 and is provided with a shoulder 100 adapted to cooperate with a shoulder 102 on the casing of the switch 42 to limit the axial movement of the member 60' under the influence of the spring 72'. The extension 80 on throttle control linkage lever 28 is adapted to engage the end of member 60' when the accelerator pedal 16 is depressed, as explained with reference to Figs. 1 and 2, to effect a closing of the switch 42 as explained above. An inverted U-shaped rod 104 has an extension 106 provided on one end thereof. One leg of the rod 104 is received in a vertical circular opening 108 in the switch housing. The other leg of the rod 104 is carried by a bracket 110 mounted on switch 42 and has a spring 112 associated therewith. The spring 112 reacts between the bracket 110 and a collar 114 provided on rod 104 to urge rod 104 to move downwardly so that the extension 106 thereon can drop behind the shoulder 100 of member 60' to hold the switch in kickdown position when the member 60' is moved to the left in Fig. 7. A cam element 116 is mounted on throttle control linkage lever 28 and is adapted to abut the lower end of the external leg of rod 104 to elevate the rod 104 when the lever 28 is moved to some predetermined position by movement of the pedal 16 towards a throttle closing position. Elevation of rod 104 in response to the camming action of element 116 necessitates that spring 112 be overcome and this is accomplished by the aforementioned return of the accelerator pedal toward a throttle closing position.

Figs. 8, 9 and 10 illustrate another form of the invention in which a member 60'' is provided with a reduced end portion having a shoulder 120 adapted to project out of the switch housing. A fixed plate 122, having a leg 124 extending in a horizontal direction therefrom is secured to the housing of switch 42 by a pair of screws 126. A cooperating plate 128 is provided with a horizontally extending leg 130 and slots 132 and 134 for the reception of screws 126. The slots permit vertical movement of the plate 128. A spring 136 is positioned between the extensions 124 and 130 and urges the plate 128 downwardly. When the member 60'' is moved to the left in Fig. 10 by contact of extension 80 of throttle control lever 28 the downward movement of plate 128 is facilitated. The slot 134, previously mentioned, is sufficiently long to have the member 60'' extend therethrough. When the shoulder 120 of member 60'' moves to the left sufficiently so that it passes the plane of plate 128, the plate 128 is urged by spring 136 to move downwardly behind the shoulder 120 and prevent a return movement of member 60'' to the right to a switch opening position. The lever 28 is provided with a cam element 140 which is adapted to cooperate with a curved lower extremity 142 of the plate 128 to overcome spring 136 and elevate plate 128 when the throttle control linkage returns to some predetermined position in response to movement of the pedal 16 towards a throttle closing position. Elevation of plate 128 frees the member 60'' for movement to the right under the influence of spring 72' to effect an opening of switch 42.

Fig. 11 illustrates another form of the invention which is capable of obtaining a similar result. In Fig. 11 a switch generally designated by the numeral 200 is mounted on a vehicle carburetor in a manner similar to that of the switch 42, referred to above. In this form of the invention the conductor 41 is electrically connected to a contact 202 which is carried by, but insulated from, the housing of switch 200.

A support 204, carried by the switch housing has a movable contact 206 pivotally mounted thereon. A second pivotally mounted member 208 has one end thereof connected to contact 206 by a spring 210 so that an over center switch is provided. A plunger 212, corresponding to member 60 of Fig. 2 is slidably mounted in a cylindrical bore 214 provided in the switch housing and opposed in movement to the left in Fig. 11 by a spring 216. The plunger 212 has an extended portion 218 of reduced diameter mounted for movement in a cylindrical chamber 219 in the housing of switch 200 and an intermediate shoulder 221. Movement of plunger 212 to the left in Fig. 11 by contact of extension 80 on throttle control lever 28, as in the Figs. 3, 5 and 8 forms of the invention, causes portion 218 thereof to move member 208 which, through spring 210, moves contact 206 to an over center position in which it is in electrical contact with contact 202 and the line 41 is grounded through the switch housing and carburetor.

The upper limit control of the Fig. 11 form of the invention includes a plate 220, having an opening 222 therein through which the portion 218 of plunger 212 extends and which is slidably mounted in a transverse opening 224 in the switch housing. The plate 220 is connected to a diaphragm 226 which has a chamber 228 thereabove connected to a source of Venturi vacuum in the carburetor. Upward movement of the diaphragm is opposed by a spring 230. Upward of plate 220 in response to a high Venturi vacuum above diaphragm 226, when a predetermined vehicle speed is exceeded, causes shoulder 221 to be obstructed by plate 220 as opening 222 therein is disaligned with bore 219.

A device is also provided for unlatching the over center switch contact 206 in response to high manifold vacuum which is obtained as an incident to a closed throttle condition. A diaphragm 240 has a chamber 242 provided thereabove which is connected to a source of manifold vacuum downstream of the throttle valve. Manifold 250 is illustrated in Fig. 11 as connected by pipe 252 to chamber 242. A slidable element 244 is carried by diaphragm 240 and provided with an abutment 246 adapted to engage a leg 248 of member 208 to rotate member 208 in response to a high manifold vacuum and through spring 210 to retract contact 206 to interrupt the circuit through switch 200.

I claim:

1. In a motor vehicle having an internal combustion engine provided with a carburetor having a throttle valve, throttle valve control linkage, a variable speed ratio transmission, a solenoid actuator adapted to effect a relatively slow speed drive of said transmission when energized and a faster speed drive when deenergized and an electrical circuit including said solenoid actuator; a switch having a movable element adapted to close said switch and energize said solenoid when moved to a predetermined position, means associated with said throttle valve control linkage and adapted to move said switch element to the predetermined switch closing position as an incident to movement of said linkage in a direction tending to open said throttle valve, a second means operable to maintain said switch in its predetermined solenoid energizing position after said linkage is retracted from its said predetermined position and additional means operable to release said switch from its solenoid energizing position in response to substantial movement of said throttle control linkage in a direction tending to close said throttle valve.

2. A control for an electrical circuit of a motor vehicle having an internal combustion engine provided with a manifold and a carburetor having a throttle valve and linkage operable to control the position of said throttle valve; said control including a switch having a housing, a first contact element, a second movable contact element and toggle means associated with said movable contact element and operable to retain the latter element in electrical contact with said first contact element, means to move said second contact element including a plunger slidably carried in said housing, spring means normally urging said plunger away from said second contact element, means associated with said linkage and operable to overcome said spring means and move said plunger and said second contact element to effect a closing of said switch as an incident to movement of said linkage beyond a predetermined position in the direction tending to open said throttle and manifold vacuum responsive means operable to overcome said toggle means and separate said contacts in response to a high engine manifold vacuum condition.

3. A control for an electrical circuit of a motor vehicle having an internal combustion engine provided with a manifold and a carburetor having a throttle valve and linkage operable to control the position of said throttle valve; said control including a switch having a housing, a first contact element, a second movable contact element and toggle means associated with said movable contact element and operable to retain the latter element in electrical contact with said first contact element, means to move said second contact element including a plunger slidably carried in said housing, spring means normally urging said plunger away from said second contact element, means associated with said linkage and operable to overcome said spring means and move said plunger and said second contact element to effect a closing of said switch as an incident to movement of said linkage beyond a predetermined position in the direction tending to open said throttle, a diaphragm having a mechanical connection with said toggle means and operable to separate said contacts when moved in a first direction and means subjecting one side of said diaphragm to engine manifold vacuum for movement in its first direction when a predetermined manifold vacuum is exceeded.

4. In a motor vehicle having an internal combustion engine provided with a carburetor having a throttle valve, throttle valve control linkage, a variable speed ratio transmission, a solenoid actuator adapted to effect a relatively slow speed drive of said transmission when energized and a faster speed drive when deenergized and an electrical circuit including said solenoid actuator; a switch having a plunger device slidably mounted for movement between a first position effecting an electrical closing of said switch and an energization of said solenoid and a second position effecting an electrical opening of said switch and deenergization of said solenoid, spring means urging said plunger device to its second position, means associated with said throttle valve control linkage and adapted to move said plunger device to its first position as an incident to movement of said linkage in a direction tending to open said throttle valve and beyond a first predetermined position, latching means operable to engage said plunger device and maintain said switch in its first solenoid energizing position and means associated with said throttle control linkage and operable to release said latching means to permit said spring means to move said plunger device to its second position to deenergize said solenoid in response to substantial movement of said throttle control linkage in a direction tending to close said throttle valve.

LOUIS B. FORMAN.

REFERENCES CITED

The following references are of record in the file of this patent:

UNITED STATES PATENTS

| Number | Name | Date |
| --- | --- | --- |
| 1,974,991 | Hutt | Sept. 25, 1934 |
| 2,328,392 | Neracher et al. | Aug. 31, 1943 |
| 2,333,668 | Neracher et al. | Nov. 9, 1943 |
| 2,342,712 | Webb | Feb. 29, 1944 |
| 2,396,551 | Boyce | Mar. 12, 1946 |